No. 697,981. Patented Apr. 22, 1902.
T. CARROLL.
CASH REGISTER.
(Application filed Aug. 17, 1900.)
(No Model.) 5 Sheets—Sheet 4.
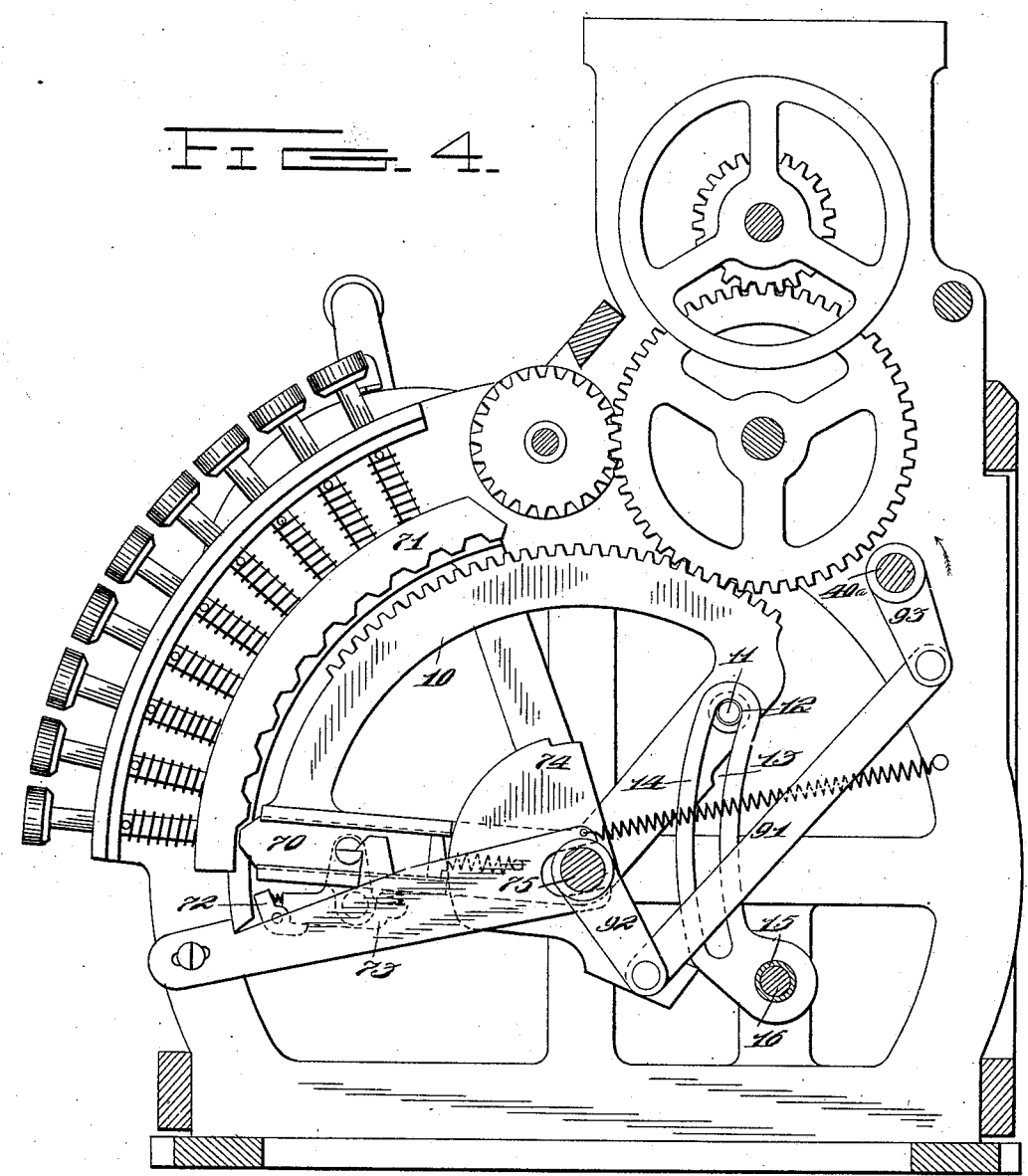
Witnesses
Wm. McCarthy
Wm. H. Huggy
Inventor
Thomas Carroll
By Alvan Macauley.
Attorney No. 697,981. Patented Apr. 22, 1902.
T. CARROLL.
CASH REGISTER.
(Application filed Aug. 17, 1900.)
(No Model.) 5 Sheets—Sheet 5.
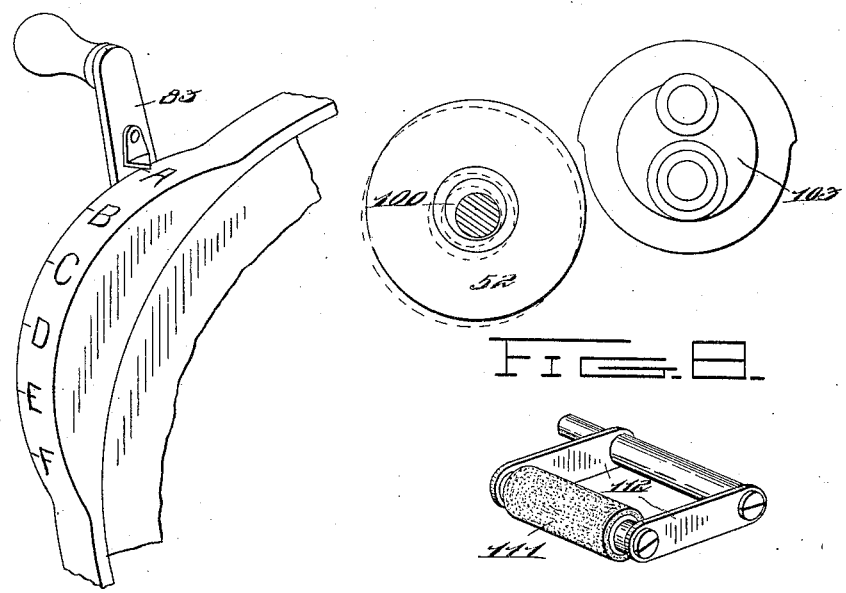
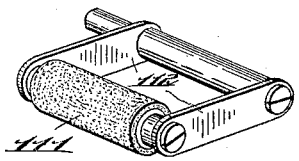
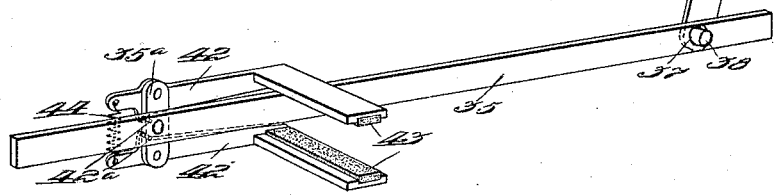
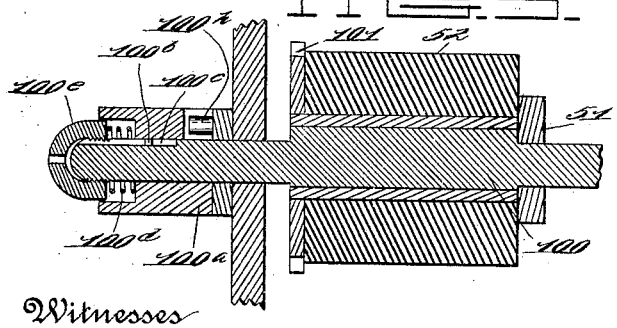
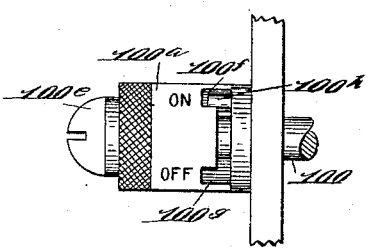
Witnesses
Wm. McCarthy
Wm. H. Muzzy
Inventor
Thomas Carroll
By Alvan Macauley.
Attorney
THE NORRIS PETERS CO., PHOTO-LITHO., WASHINGTON, D. C.

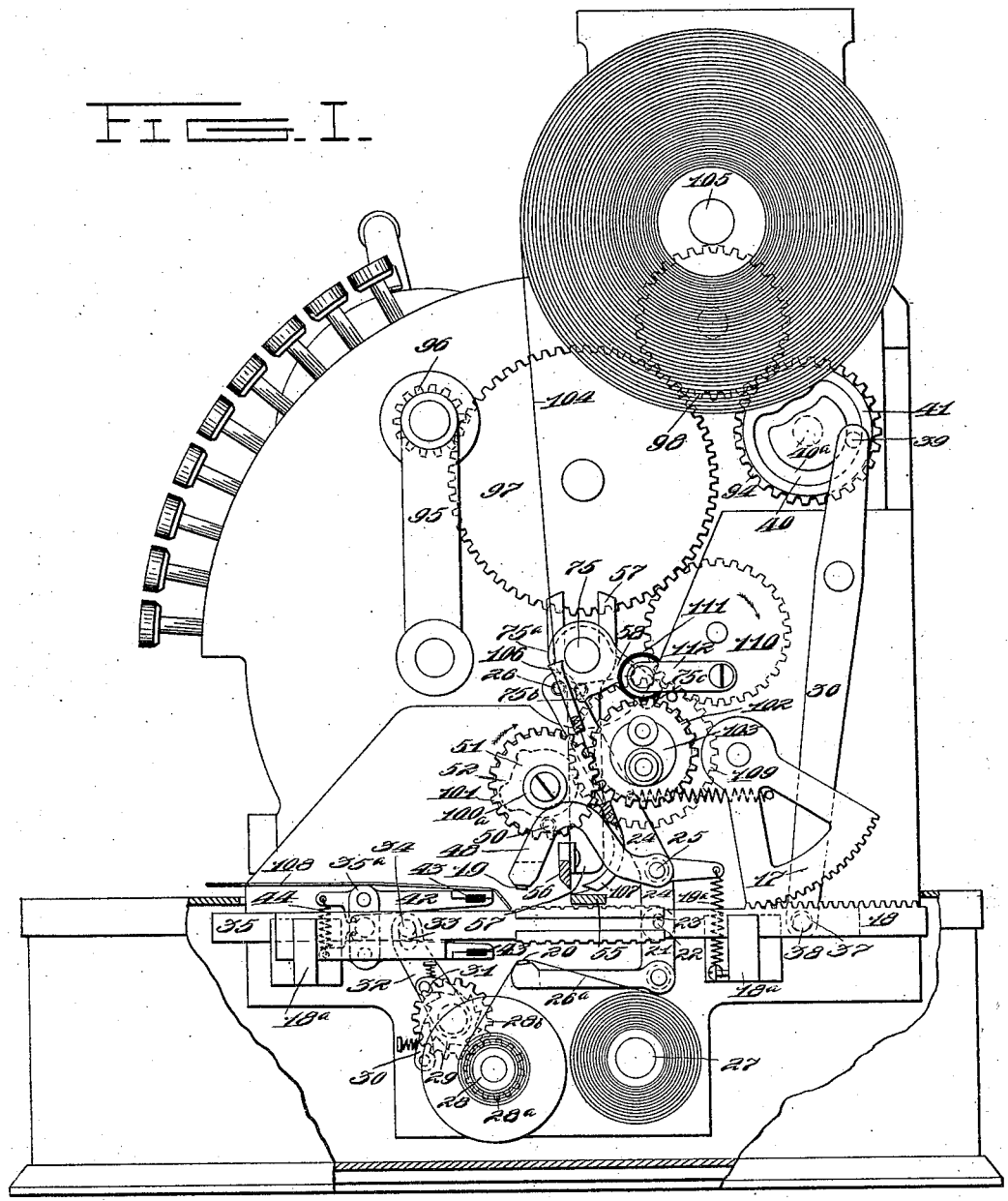

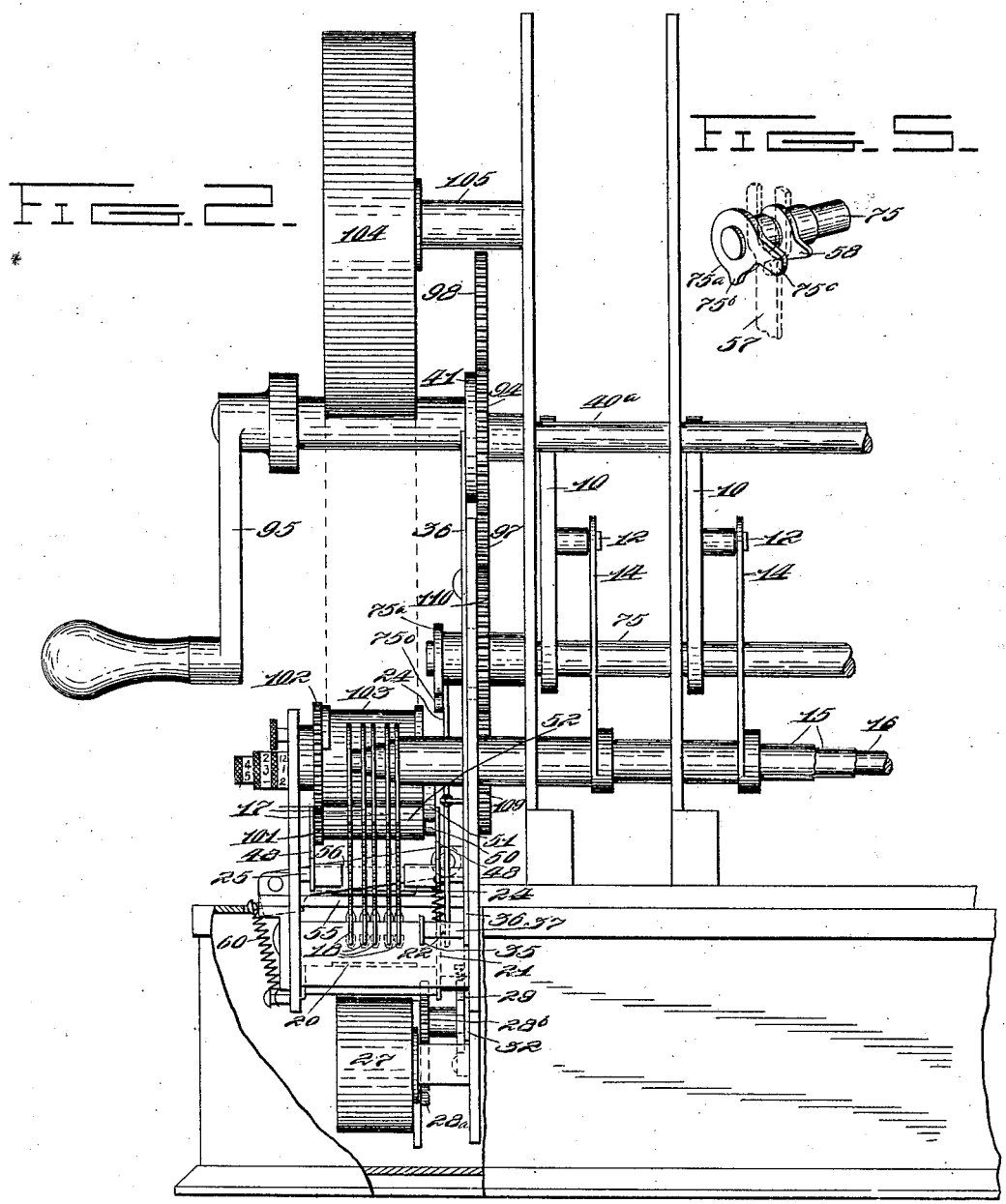

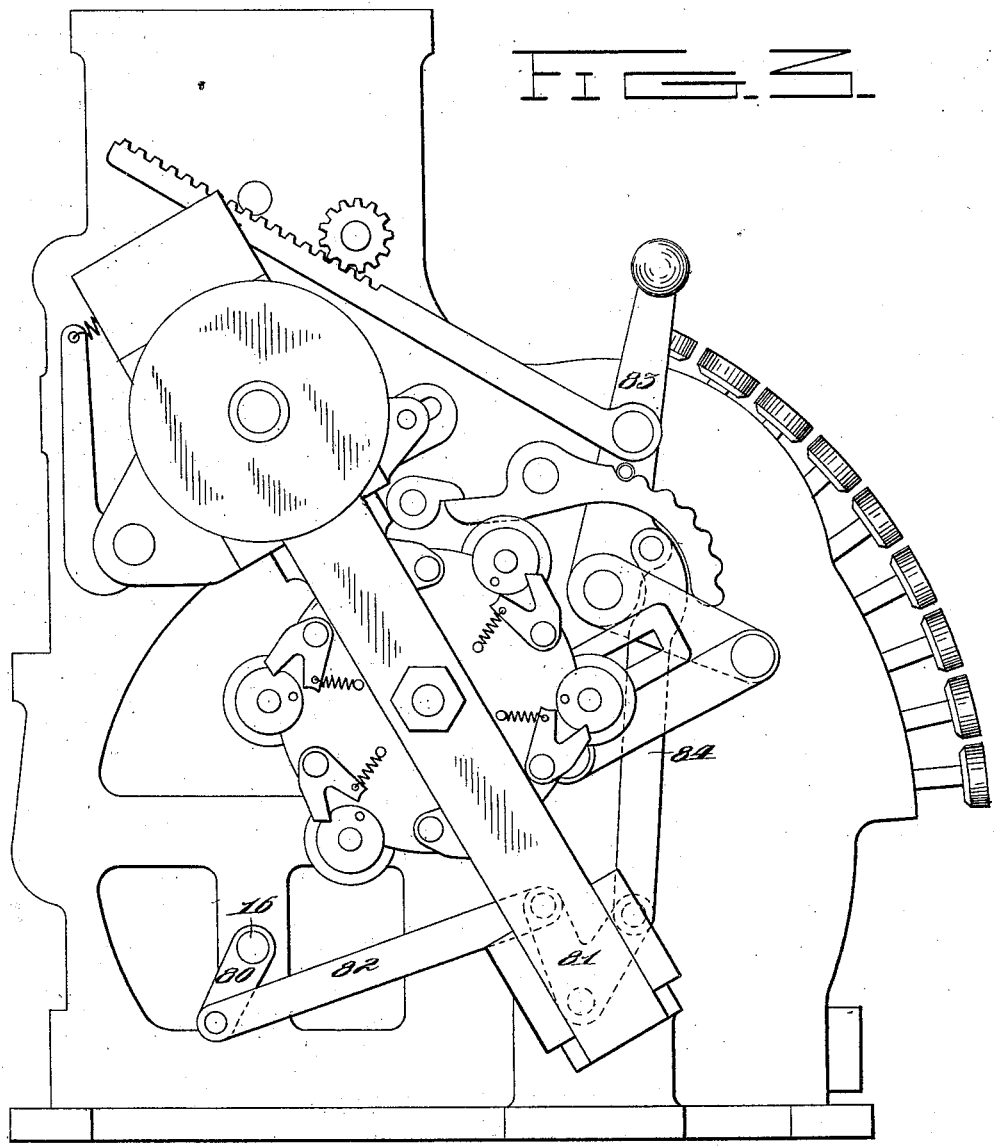

UNITED STATES PATENT OFFICE.

THOMAS CARROLL, OF DAYTON, OHIO, ASSIGNOR TO THE NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 697,981, dated April 22, 1902.

Application filed August 17, 1900. Serial No. 27,164. (No model.)

*To all whom it may concern:*

Be it known that I, THOMAS CARROLL, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash-registers, and has more particular relation to improvements in printers for the type of register patented to Messrs. Cleal and Reinhard April 13, 1897, and numbered 580,378.

The primary object of the invention is the application to a machine of the class mentioned of an improved printing mechanism for printing both a check and a detail strip.

In the appended drawings, forming part of this specification, Figure 1 represents an end elevation, partly in section, of the devices embodying my invention applied to a multiple-counter machine of the type mentioned and similar to that covered by my copending application, Serial No. 731,443, filed September 23, 1899, the cabinet being omitted. Fig. 2 represents a partial rear elevation of the same, a number of the parts being omitted for clearness. Fig. 3 represents a view similar to Fig. 1, taken from the opposite end of the machine, the cash-drawer being omitted. Fig. 4 represents a central vertical section through the machine with the cash-drawer omitted. Fig. 5 represents a detail perspective view of the cams for operating one of the platens and the check-knife. Fig. 6 represents a detail front elevation of the scale-plate in proximity to which the special adjusting-lever is moved. Fig. 7 represents a detail perspective view of the slide carrying the inking-arms. Fig. 8 represents a detail perspective view of the ink-roller and its supporting-arms. Fig. 9 represents a detail central vertical section through the adjustable check-feeding roller. Fig. 10 represents a detail top plan view of the knob and coacting parts for turning the check on and off, and Fig. 11 represents a detail end elevation of the two check-feeding rollers.

In general terms the machine to which my invention is applied may be described as being a crank-operated machine in which a series of rack-segments 10 for operating indicators and counters are arranged to be operated or rocked to a greater or less degree, according to the value of the key operated. (See Fig. 4.) The segment-controlling devices comprise in each case a slidable latch-plate 70, suitably mounted on the segment and arranged to be thrown into locking engagement with a stationary notched segment 71 by the lower end of the depressed key, with which a pawl 72, carried by a plate 73, pivoted on the segment, contacts. When the plate 70 is forced forward into engagement with the segment 71, the rack-segment is arrested, but the actuating-disk 74, mounted on the main rock-shaft 75, continues its full movement as the slide 70 is disengaged therefrom when moved forward, as aforesaid. The said shaft 75 receives its rocking movement from the main rotation-shaft 40$^a$ through the medium of a link-bar 91, which is pivotally connected to an arm 92, fast to the rock-shaft, and a crank-arm 93, fast to said rotation-shaft, all as best shown in Fig. 4. The outer end of the shaft 40$^a$ carries a gear 94, which is connected to the operating crank-handle 95 by intermediate gears 96, 97, and 98, mounted on the main frame, as shown in Fig. 1. The above-described construction is old and well known in the art and needs no further description here. As said segments are thus moved different distances, according to the values of the keys operated, I utilize them for securing the proper setting movements for the type-carriers. To this end each of the said segments is provided with a laterally-projecting pin or stud 11, carrying an antifriction-sleeve 12, as better shown in Fig. 4. These rollers project into elongated cam-slots 13, formed in a series of curved levers or arms 14, which are fast upon a series of nested sleeves 15. These sleeves are mounted upon a transverse rock-shaft 16, and each of the same, as well as said rock-shaft, carries a segmental gear 17 at its outer end, said sleeves and shaft being of different lengths, so that the gears attached thereto will lie side by side, as shown in Fig. 2. The shaft 16, which represents the special bank, is not operated through the medium of one of the rack-segments 10, but is provided at one end with a crank-arm 80. (See Fig. 3.) This arm is connected to a pivoted bell-crank lever 81, mounted on the main frame, by a pivoted link-bar 82, and said bell-crank lever is in turn pivotally connected to a hand-lever 83 by a pivoted link-bar 84. The said hand-lever 83 is moved or adjusted according to a suitable scale on the front of the machine to rock the shaft 16 to a greater or less extent and through the segment 17 fast thereon adjust the printing-bar connected thereto accordingly. (See Fig. 6.) Said lever 83 is provided with suitable connections for operating or setting a suitable indicator and a suitable multiple-counter drum; but as these devices form no part of the present invention and are included in the aforesaid application no further description of the same is thought necessary.

It will be observed from the above that as the segments 10 and the arm 80 receive variable movements, according to the values of the keys operated or the adjustment of the lever 83, that the segments 17 will receive similar movements. In the aforesaid patented machine, as also in the present instance, the segments 10 are left standing, at the end of each operation of the machine, in the positions to which they have been adjusted.

Each of the segments 17 meshes continuously with one of a series of slidable rack-bars 18, which are mounted in suitable grooved guide-blocks $18^a$, fast to the main frame, and each of which is formed with two sets of types located, respectively, upon the upper and lower sides of said bar for simultaneously printing on a check and on a detail-strip the amount registered and a special clerk's designation or department designation. Each set of these types, excepting the special types, is numbered from "0" to "9," so that upon the proper movement of said bars any desired combinations of numbers may be brought to printing position to record any desired amount within the capacity of the machine. The said printing position is in the same vertical plane with two printing-platens 19 and 20, respectively. The lower platen 20 is suitably mounted in a bell-crank lever 21, the upper end of which is provided with a laterally-projecting pin 22, which extends into an elongated slot 23, formed in the lower end of a bell-crank lever 24, pivoted upon a short shaft 25, which is mounted on the main frame. The upper end of the lever 24 is provided with an antifriction-roller 26, which is normally drawn into engagement with the periphery of a cam $75^a$, mounted on the protruding end of the shaft 75, as better shown in Fig. 5. This cam is formed with a small cam projection $75^b$ and a larger cam projection $75^c$. When the shaft 75 is rocked, as before described, the projection $75^b$ first engages the roller 26 and imparts sufficient movement to the platen 20 to cause it to force the inking-pad, hereinafter described, into contact with the lower types, which are then in the printing position. The second or larger cam projection $75^c$ forces the roller 26 far enough forward to bring the detail-strip $26^a$, which passes over the platen 20, into contact with the inked types. The projection $75^c$ does not pass the roller 26, and thus as the shaft 75 is rocked back the platen 20 will only be moved by the small projection $75^b$, which will not have any effect at this time, as the ink-pad will be withdrawn out of the path of the platen. The said detail-strip $26^a$ is drawn from a supply-roll 27 and after passing over the platen 20 is wound upon a feeding-roller 28. This latter roller is provided at its inner end with a pinion $28^a$, which meshes with a similar pinion $28^b$, mounted on the printer-frame. The pinion $28^b$ carries a ratchet-wheel 29, which is engaged by a spring-pressed pawl 30, mounted on the printer-frame, to prevent all retrograde movement of said wheel. The wheel is fed forward to feed the paper by a spring-pressed pawl 31, mounted on a pivoted lever 32, which is formed at its upper end with an elongated slot 33, which receives an antifriction-roller 34, mounted on a slide 35, in turn suitably mounted in the main frame. The said slide 35 receives its reciprocating movements through a crank-lever 36, pivoted on the main frame and formed at its lower end with a slot 37, into which projects a pin 38, mounted on said slide. (See Fig. 7.) The upper end of the lever 36 is provided with an antifriction-roller 39, which projects into a cam-groove 40, formed in a disk 41. The cam-grooved disk 41 is mounted on the main rotation-shaft $40^a$ and, as will be seen by reference to Fig. 1, is of such formation as to give the lever 36 a short quick movement and actuate the slide 35 correspondingly.

The slide 35 carries a rigid vertical plate $35^a$, to the upper and lower ends of which are pivoted angular levers 42, which carry the inking-pads 43. The forward ends of the levers 42 are connected by a coil-spring 44, so as to normally hold the inking-pads in the positions shown in Figs. 1 and 7, the movement of the levers being limited by pins $42^a$, mounted thereon so as to abut against the edge of the plate $35^a$. After the arms 42 are moved forward by the operation of the slide 35 the ink-pads thereon are forced into contact with the types in printing position by the initial movements of respective platens 19 and 20, which engage said arms.

The means for imparting the initial movement to the platen 20 has been described above, and I will now describe that for operating the platen 19. This platen is mounted on an arm 48, suitably journaled on the shaft 25, and is normally held in its elevated position by a coil-spring $19^a$, connecting the same to one of the guide-blocks $18^a$. Said arm 48 is provided with a roller 50, which coöperates with a cam 51, similar to cam $75^a$ and fast to a check-feeding roller 52. This roller 52 is journaled on a short eccentric shaft 100, which in turn is journaled in the printer-frame and carries a gear-wheel 101. (See Fig. 9.) This gear normally meshes with a similar gear 102, mounted on a printing-drum 103, which is suitably journaled on the printer-frame. The eccentric shaft 100 is adapted to be rotated to move the roller 52 away from the drum 103 and disengage the gear 101 and 102 by a thumb-knob 100$^a$, mounted loosely upon the protruding end of the shaft 100 and connected thereto by a pin 100$^b$, which projects into a longitudinal groove 100$^c$, formed in said shaft. A coil-spring 100$^d$ is mounted in a recess formed in said knob and engages both the knob and a screw-nut 100$^e$, fast to the end of the shaft, which construction results in the knob normally being forced inward. The knob has formed therein two notches 100$^f$ and 100$^g$, (see Fig. 10,) which are arranged to coact with a stud 100$^h$, fast to the frame, to hold the shaft 100 in its different adjusted positions in a manner well known in the art.

By the above construction the shaft 100 may be rotated to move the roller 52 into contact with the drum 103 and feed the check, or vice versa, the movements of the roller 52 also controlling the check-platen, as aforesaid. This drum 103 may carry any suitable printing devices, but is preferably constructed in a similar manner to the drum shown in Patent No. 541,247, granted June 18, 1895, for printing both a date and a consecutive number on the check-strip. This printing-drum, in connection with the roller 52, is adapted to feed forward as well as print the check-strip 104, which is mounted on a supply-roller 105 and passes down through a guiding-chute 106, fast to the printer-frame. After leaving the printing and feeding rollers the strip passes through a rigid curved chute 107 and thence forward between the platen 19 and the type-bars and out over a guard-plate 108, which is suitably secured to the platen-lever 42. The said drum 103 is rotated by a gear 109, mounted on its extended journal end and meshing with a gear 110, which in turn meshes with the aforesaid gear 97.

The printing-types on the drum 103 are inked upon each revolution of the drum by an absorbent ink-roller 111, suitably mounted in supporting-arms 112 and resting upon said drum, said arms being suitably pivoted upon the printer-frame, as shown in Fig. 8.

The check-paper after leaving the chute 107 passes between two knives 55 and 56. The said knife 55 is stationary, while the knife 56, which is pivoted to it at one end, is arranged to be actuated by a slide-bar 57, pivotally connected to the same and having an antifriction-roller, which receives motion from a cam 58, mounted on the main rock-shaft 75, the upper end of the bar 57 being slotted, so as to receive the shaft 75 and be guided thereby. The knife 56 is returned to its normal elevated position after being depressed by a coil-spring 60, which connects the same to the printer-frame, as best shown in Fig. 2.

It will be seen by reference to Figs. 1 and 2 that this new printing attachment occupies part of the usual drawer-space to the right of the machine, and thus leaves the left side of the machine free for the attachment of a multiple-counter drum, as shown in Fig. 3. Further, this location of the printing attachment brings the guard 108 nearly on a level with the top of the drawer-casing, and the check thus issues at this point, where it is most convenient to remove the same.

Having thus described my invention, what I claim as new, and desire to secure by Letters Patent, is—

1. In a cash-register, the combination with a series of operating-segments arranged to be moved different distances and carrying antifriction-rollers, of a series of slotted arms into which said rollers project, a series of nested sleeves supporting said arms and printing devices connected to said sleeves.

2. In a cash-register, the combination with a series of operating-segments, of a series of slotted arms engaged by projections on said segments, nested sleeves operated by said arms, rack-segments carried by said sleeves, rack-bars meshing with said latter segments and carrying printing-types and printing devices coöperating with said types.

3. In a cash-register, the combination with a series of operating-segments, of a series of slotted arms engaged by projections on said segments, nested sleeves operated by said arms, rack-segments carried by said sleeves, rack-bars meshing with said rack-segments and carrying types upon their upper and lower edges, and platens coöperating with the respective sets of types.

4. In a cash-register, the combination with a series of operating-segments, of a series of slotted arms coöperating therewith, a series of nested sleeves supporting said arms, rack-segments carried by said sleeves, a series of rack-bars meshing with said segments and carrying types upon their upper and lower edges, platens coöperating with the sets of types for respectively printing a detail-strip and a check and means for throwing the check-platen out of operative position at will.

5. In a cash-register, the combination with a series of operating-segments carrying antifriction-rollers, of a series of slotted arms into which said rollers project, a series of nested sleeves supporting said arms, a series of rack-segments carried by said sleeves, a series of rack-bars meshing with said segments, and carrying types, a platen, and means for throwing said platen into and out of operative position.

6. In a cash-register, the combination with a series of operating-segments, of a series of slotted arms coöperating therewith, a series of nested sleeves supporting said arms, a series of rack-segments mounted on said sleeves, type-bars operated by said rack-segments, a slide carrying inking-arms, platens arranged to operate the inking-arms, a lever for moving the slide, and a cam connected to the movable parts of the machine for operating said lever.

7. In a cash-register the combination with a driving-shaft, of driven members arranged to be uncoupled from the driving-shaft by the keys, type-carriers, means connecting the carriers to the driven members, strip-feeding devices, a slide operating a knife and a cam on the driving-shaft for operating said slide.

8. In a cash-register, the combination with operating devices, of a printing mechanism comprising a series of types, inking-arms, a slide for operating said arms, platens for forcing said arms into contact with the types, means connected to the movable parts of the machine for operating said slide, a detail-strip feed-roller operated from said slide, means for operating the platens, and devices for rendering one of the platens inoperative.

9. In a cash-register, the combination with a series of keys, of a driving member, driven rack-segments, devices for coupling said segments to the driving member arranged to be tripped by the operated keys, antifriction-rollers mounted on the rack-segments, pivoted arms having cam-slots into which said rollers project, type-carriers and nested sleeves connecting said arms and carriers.

10. In a cash-register, the combination with a series of keys, of a driving member, driven rack members, arranged to be uncoupled from the driving member by the keys, antifriction-rollers mounted on the rack members, a series of nested sleeves, arms mounted on said sleeves and formed with cam-slots for the reception of the antifriction-rollers, type-carriers and means connecting said sleeves and carriers.

11. In a cash-register, the combination with a series of keys, of a driving member, driven rack members arranged to be uncoupled from the driving member by the keys, pivoted slotted arms engaging projections on said rack members, type-carriers, and means connecting said arms and carriers.

12. In a cash-register, the combination with a series of keys, of a series of rack-segments, movable means mounted on said segments and arranged to engage an operated key to arrest the segment, a series of slotted arms, projections on the segments extending into the slots in said arms, a series of type-carriers and means connecting the slotted arms and carriers.

In testimony whereof I affix my signature in the presence of two witnesses.

THOMAS CARROLL.

Witnesses:
IRA BERKSTRESSER,
T. RAY CARROLL.